Patented Aug. 7, 1951

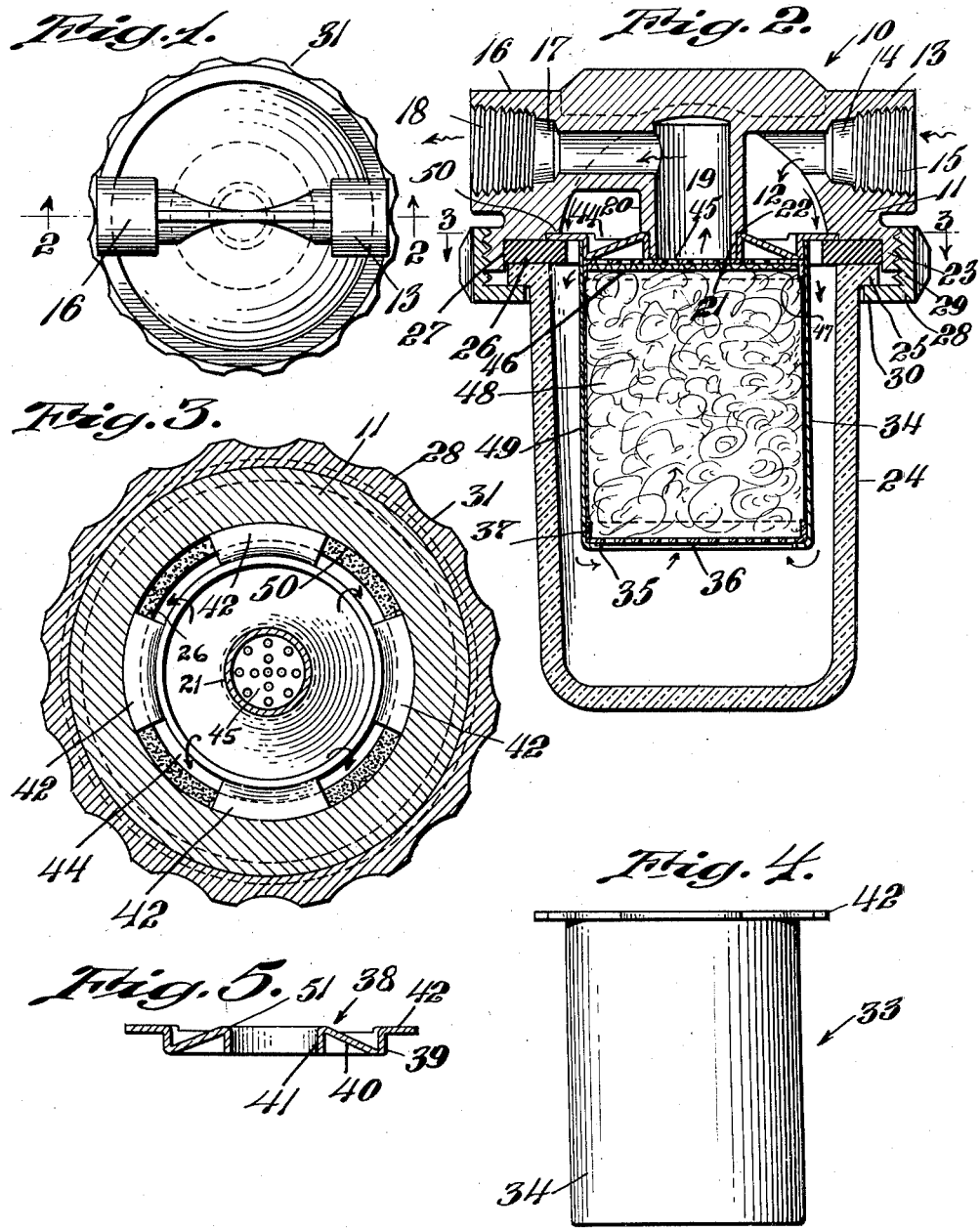

2,563,548

UNITED STATES PATENT OFFICE 2,563,548

FILTER FOR LIQUIDS

Raymond A. Plante, Pawtucket, R. I., assignor to Fram Corporation, a corporation of Rhode Island Application November 24, 1947, Serial No. 787,770

2 Claims. (Cl. 210—164)

1

This invention relates to a filter which is particularly designed for use with an internal combustion engine for filtering gasoline, although the same may be used for other similar liquids should the occasion require.

One of the objects of this invention is to provide a filter which will first separate water from the gasoline and will then remove from the gasoline any solid foreign particles which may be in the gasoline.

Another object of this invention is to provide a filter having a cartridge therein which may be easily removed and replaced by a fresh one.

Another object of this invention is to provide a filter element cartridge through which all of the liquid to be filtered will pass and one which may be removed and replaced by a fresh cartridge after the element has become so contaminated with foreign matter that the flow therethrough is materially restricted.

Another object of this invention is to so support the cartridge that the bowl may be removed while leaving the cartridge in position.

Another object of the invention is to provide a sealing gasket which will at the same time spring load the connection of the bowl to the head so that the connecting means will be maintained in position.

Another object of the invention is to provide in the head a recess or some centering means for laterally locating the cartridge with reference to the head and the bowl.

Another object of the invention is to prevent the filtering means from leaving the side wall of its cartridge so that liquid could bypass along the wall.

With these and other objects in view, the invention consists of certain novel features of construction, as will be more fully described and particularly pointed out in the appended claims.

In the accompanying drawings:

Fig. 1 is a top plan view of the filter;

Fig. 2 is a section on line 2—2 of Fig. 1 on a somewhat enlarged scale;

Fig. 3 is a section on line 3—3 of Fig. 2;

Fig. 4 is an elevation of the replaceable cartridge alone;

Fig. 5 is a sectional view of the flange member of the cartridge which also provides a means for sealing the cartridge against the head so as to direct the flow of the liquid.

In proceeding with this invention, I provide a head and bowl which are held together by a nut having screw threaded engagement with the head and a lip to engage a flange on the bowl. Between these two, a gasket of neoprene or suitable material is provided which is sufficiently resilient so as to spring load the threaded engagement. This gasket also provides a shoulder to hold the arms which form a part of the filter element cartridge so as to support the cartridge in the bowl. The head at a point adjacent to the location of the gasket is recessed so as to laterally locate the cartridge and centralize it in the bowl. The cartridge is sealed to a boss which provides the exit opening from the head so that the flow of liquid is directed into the bowl and upwardly through the cartridge. Within the cartridge any suitable filtering material may be provided such as fibrous material which I have found to be advantageously formed of cotton, wool and rayon with some sort of a chemical treatment. This material is mixed together and is sealed to the cylindrical wall of the cartridge element by some sort of an adhesive so that the gasoline cannot bypass the fibrous material.

With reference to the drawings, 10 designates generally a head of the filter usually formed from some metal alloy material. This head may be either cast or forged and is generally circular in shape as shown at 11 in Fig. 3, which is hollowed out as at 12 as shown in Fig. 2 on its under inner surface. The head is provided with a boss 13 through which an entrance opening 14 extends, the boss being threaded as at 15 for the connection of a suitable conduit. Diametrically opposite there is another boss 16 which is provided with an exit opening 17 which is threaded at its end as at 18 for the connection of another conduit. One suitable use of this filter is between the fuel pump and the carburetor of an internal combustion engine so that the entrance connection to the threaded portion 15 will be a conduit extending to the fuel pump while the threaded portion 18 will be connected to another pipe which will lead to the carburetor. This opening 17 in the head joins a right angularly extending passage 19 in the boss 20 which extends perpendicularly to the general line of the openings 14 and 17. The inner end of this boss 20 is reduced as at 21 so as to provide a shoulder 22. The outer lower edge of the head is threaded as at 23 for a quick detachable connection.

A glass bowl designated 24 is provided with a flange 25 extending outwardly therefrom and is of a size to engage the soft resilient gasket 26 which fits within a recess 27 in the under surface of the head 10 with sufficient resilient pressure to maintain it therein. A ring 28 has internal threads 29 to have engagement with the threads 23 of the head and is provided with an inwardly extending lip 30 to engage beneath the flange 25 of the bowl 24. The outer edge of this ring 28 is scalloped as at 31 so as to provide a good hand engagement for manually tightening or loosening the same without the necessity of using a wrench. When this ring is screwed up, it will draw the bowl tightly against the gasket and hold the head, bowl and ring in tightly sealed relation. The gasket will be sufficiently compressed so as to spring load this threaded connection and prevent it from jarring loose or moving in a direction to release the threaded connection.

The filtering element is in the form of a cartridge 33 which is cylindrical in shape having an open bottom and open top. This cylindrical shell is designated 34 and is inturned at its lower end as at 35 which serves to support a screen 36 which is generally in the shape of a disc with its periphery turned upwardly at 37 so as to snugly fit within the shell 34 and rest upon the inturned edge 35. The upper end of the cartridge is provided with a closure member 38 (see Fig. 5) which has a cylindrical portion 39 to snugly fit the inner surface of the shell 34 with a solid upwardly inclined wall 40 which is bent sharply to provide a knee as at 41 to extend downwardly or generally parallel to the cylindrical wall 39. Extending outwardly from the cylindrical wall 39 there are four arms 42 which are best shown in Fig. 3 where this member is shown in plan. These arms are symmetrically located and are spaced from each other as shown in Fig. 3 so as to leave openings 44 between these arms through which liquid to be filtered may very readily pass. This member 38 is fixed in the upper end of the shell 34 such as by welding and beneath this member there is provided a screen 45 which is a duplicate of the screen 36 and thus has downwardly extending flanges as at 47 to extend along the cylindrical shell 34. A piece of cotton fabric 46 may also be provided on the under surface of the screen.

Within the shell there is provided a fibrous material 48 which will preferably be a mixture of cotton, wool and rayon in the percentages of 40% cotton, 40% wool, and 20% rayon. Some chemical treatment with a wetting agent such as triethanolamine may be provided on this fibrous material if desired. This material is usually mixed intimately so that portions of all of these fibers are in all parts of the element and then the element is attached to the cylindrical shell 34 by an adhesive designated 49 and which may consist of one of some adhesives which is insoluble in the liquid to be filtered.

This cartridge 33 thus complete as above described is located centrally with respect to its axis in the bowl 24. The arms 42 of the cartridge are received in a recess 50 on the under surface of the head just above the gasket 26 which is circular in shape and will receive the edge of the arms which are on the arc of a circle of substantially the same size. Thus the location of these arms in this recess will laterally locate the element and centralize it within the bowl and with reference to the head. The collar 41 of the top wall of the element is so sized as to closely fit the reduced portion 21 of the boss 20 and the folded knee portion 51 will engage the shoulder 22. There is sufficient flexibility in this diaphragm like top wall 38 so that as the gasket is forced upwardly, the knee 51 will engage the shoulder and flex the diaphragm to form a tight seal at this location.

The shape of the top member 38 of the element is such that flow throughout the full diameter of the cartridge may occur out through the screen 45 by reason of the space above the cartridge and this liquid may then very easily find its way into the discharge passage 19 after passing above the filter material.

I claim:

1. A liquid filter comprising a head with means for entrance and exit of liquid to be filtered, said head having a downwardly facing recess the side wall of said recess being cylindrical, a resilient gasket in said recess compressed sufficiently to exert a pressure against said wall and maintain itself in said recess, a filtering element having rigid radial arms at its upper end extending over said gasket to be supported thereby, a liquid containing bowl having a flange at its upper end engaging said gasket on the surface thereof opposite that surface engaged by said arms and means to engage said flange and hold the bowl against said gasket.

2. A liquid filter as in claim 1 wherein said head has a second recess stepped inwardly from said first recess the side wall of said second recess being cylindrical, said arms extending into said second recess, said arms in said recess serving to locate said element with respect to said head.

RAYMOND A. PLANTE.

REFERENCES CITED

The following references are of record in the file of this patent:

UNITED STATES PATENTS

| Number | Name | Date |
|---|---|---|
| 1,502,545 | Bowes | July 22, 1924 |
| 1,604,048 | Hobbs | Oct. 19, 1926 |
| 1,630,287 | Amdursky | May 31, 1927 |
| 1,630,480 | Fesler | May 31, 1927 |
| 1,671,606 | Pierce | May 29, 1928 |
| 1,860,229 | Briggs | May 24, 1932 |
| 2,145,304 | Hill | Jan. 31, 1939 |
| 2,253,685 | Burckhalter | Aug. 26, 1941 |
| 2,253,686 | Burckhalter | Aug. 26, 1941 |
| 2,280,033 | Aldham | Apr. 14, 1942 |

FOREIGN PATENTS

| Number | Country | Date |
|---|---|---|
| 650,951 | France | Feb. 13, 1929 |